United States Patent
Miyatake et al.

(10) Patent No.: US 7,037,573 B2
(45) Date of Patent: May 2, 2006

(54) ANTIREFLECTION FILM, ITS PRODUCTION METHOD, OPTICAL DEVICE, AND IMAGE DISPLAY

(75) Inventors: Minoru Miyatake, Ibaraki (JP); Masahiro Yoshioka, Ibaraki (JP); Tomoaki Masuda, Ibaraki (JP); Atsushi Kitagawa, Ibaraki (JP); Hiroyuki Takao, Ibaraki (JP); Kaori Shirouzu, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 0 days.

(21) Appl. No.: 10/507,484

(22) PCT Filed: Mar. 12, 2003

(86) PCT No.: PCT/JP03/02890

§ 371 (c)(1),
(2), (4) Date: Sep. 13, 2004

(87) PCT Pub. No.: WO03/079059

PCT Pub. Date: Sep. 25, 2003

(65) Prior Publication Data

US 2005/0163977 A1    Jul. 28, 2005

(30) Foreign Application Priority Data

Mar. 15, 2002 (JP) ............................. 2002-071448
Jul. 22, 2002 (JP) ............................. 2002-212750
Jul. 22, 2002 (JP) ............................. 2002-212751
Mar. 3, 2003 (JP) ............................. 2003-055268

(51) Int. Cl.
*B32B 3/00* (2006.01)
*B32B 9/04* (2006.01)
*B05D 5/06* (2006.01)

(52) U.S. Cl. ............... 428/195.1; 428/206; 428/441; 428/447; 427/163.1; 427/164; 427/168; 427/169

(58) Field of Classification Search ............... 428/446, 428/447, 141, 142, 143, 145, 500, 702, 195, 428/206; 427/143.1, 164, 168, 169
See application file for complete search history.

(56) References Cited

U.S. PATENT DOCUMENTS

| | | | |
|---|---|---|---|
| 4,904,525 A | 2/1990 | Taniguchi et al. | |
| 6,008,940 A | 12/1999 | Michihata et al. | |
| 2002/0034008 A1 | 3/2002 | Ohishi et al. | |

FOREIGN PATENT DOCUMENTS

| | | |
|---|---|---|
| JP | 58-52601 | 3/1983 |
| JP | 63-21601 | 1/1988 |
| JP | 9-208898 | 8/1997 |
| JP | 2000-47005 | 2/2000 |
| JP | 2002-6109 | 1/2002 |

*Primary Examiner*—Rena Dye
*Assistant Examiner*—Timothy M. Speer
(74) *Attorney, Agent, or Firm*—Westerman, Hattori, Daniels & Adrian LLP

(57) ABSTRACT

An antireflection layer is formed directly or through an other layer at least on one side of a transparent base film of an antireflection film. The antireflection layer is made of at least two kinds of low refractive index materials satisfying a relationship of refractive index: $n_d^{20} \leq 1.49$. The antireflection layer is excellent in antireflection characteristics and mar resistance. When the antireflection layer is formed on a hard coat layer having an uneven surface roughened by particles, the antireflection film is excellent in antiglareness.

17 Claims, 1 Drawing Sheet

ANTIREFLECTION FILM, ITS PRODUCTION METHOD, OPTICAL DEVICE, AND IMAGE DISPLAY

FIELD OF THE INVENTION

The present invention relates to an antireflection film and a method for manufacturing the same. Furthermore, this invention relates to polarizing plates, optical elements, and image viewing displays using the antireflection film concerned. An antireflection film of this invention has a low-refraction layer as an antireflection layer, which can reduce surface reflected light and provide excellent visibility. Optical elements using this antireflection film such as antireflection polarizing plate, are suitably used in various image viewing displays, such as liquid crystal displays, organic EL displays, and PDPs, CRTs.

BACKGROUND ART

Liquid crystal panels are is now establishing resolute position as displays based on research and development in recent years. However, frequent use of liquid crystal displays under bright lighting in monitors for car navigation and monitors for video cameras causes significant decrease in visibility by surface reflection. For this reason, polarizing plates equipped for these instruments necessarily requires antireflection layer treatment thereon. Polarizing plates having antireflection treatment performed thereto are used to almost all liquid crystal displays with high frequency of outdoor use. Moreover, ghost phenomena in outside environment of lighting light, such as fluorescent lamps, sunlight, and keyboarders, etc. being reflected on a screen, decreases visibility. For this reason, antiglare treatment is performed to polarizing plates.

In antireflection layer treatment, a design for reducing reflection of visible light region as much as possible is in general adopted in which a multilayered laminated layer, with two or more thin films, comprising materials having different refractive indexes is produced, using techniques, such as a vacuum deposition method, a sputtering method, and a CVD method. However, formation of a thin film in the above-mentioned dry treatment requires vacuum equipments, causing to high treatment expense. Therefore, recently, formation of antireflection layer in a wet coating method is usually performed. Usually, antireflection films have a configuration comprising a hard coat layer on a transparent base film, and furthermore an antireflection layer having a low refractive index. From a viewpoint of reflectance, a hard coat layer requires a higher refractive index, and an antireflection layer requires a lower refractive index. As lower refractive index materials, polymers including fluorine etc. are used from a viewpoint of refractive index or antifouling property (for example, refer to Japanese Patent Laid-Open No. 9-208898 official report).

However, although polymers including fluorine are very excellent in refractive index, formed films is very soft, and moreover, adhesion property with a hard coat resin layer is difficult to be secured. Therefore, there have been problems that scraping of the antireflection layer surface using polymers including fluorine with a cloth damages the surface. In order to solve the problems, investigated are a method of using siloxane based materials as a forming material of the antireflection layer, and a method in which an inorganic vapor deposition film with a thickness not more than a thickness of an optical film (antireflection layer) is prepared on the antireflection layer formed of polymers including fluorine. However, the above-mentioned methods cannot fully solve the problems because of higher reflectance caused by rise of refractive index, or of complicated manufacturing process.

The present invention aims at providing an antireflection film comprising an antireflection layer formed of low refractive index materials on a transparent base film, the antireflection film having outstanding antireflection characteristics and abrasion resistance, and a method for manufacturing the film.

Moreover, these invention aims at providing an antireflection film having excellent antireflection characteristics and abrasion resistance, and also excellent antiglare property.

Furthermore, this invention aim at providing a polarizing plate using the above-mentioned antireflection film, and an optical element, and furthermore aims at providing image viewing displays using them.

DESCRIPTION OF THE INVENTION

As a result of wholehearted research made by the present inventors in order to solve the above-mentioned problems, it was found out that the above-mentioned object might be attained using a following antireflection film, thus leading to completion of the present invention.

That is, this invention relates to an antireflection film comprising an antireflection layer being formed at least on one side of a transparent base film directly or through an other layer, whrerein the antireflection layer is made of at least two kinds of low refractive index materials satisfying a relationship of refractive index: $n_d^{20} \leq 1.49$.

In this invention, the antireflection layer is made of two or more low refractive index materials. Therefore, exhibiting the characteristics of each low refractive index material enables coexistence of antireflection characteristics and abrasion resistance. Each refractive index of the low refractive index materials has a value $n_d^{20}$ (hereinafter, referred to as only refractive index) of 1.49 or less. The refractive index is preferably 1.45 or less. Especially, a refractive index of a material having larger occupied volume fraction is preferably 1.42 or less.

In the antireflection film, an antireflection layer may have separated structure where different areas are formed. Moreover, the separated structure may have a continuous matrix with dispersed phase structure. When the antireflection layer forms a minute continuous matrix with dispersed phase structure, an effect is shown that functions of each material forming the continuous matrix with dispersed phase structure are add together, as generally shown in documentary materials, such as polymer alloys.

In the antireflection film, a size of a short area in the separated structure having the fine structure is preferably in a range of 5 to 1,000 nm based on a relationship of a film strength and appearance. In addition, a size of the short area may be obtained in the way that: a fine structure of an antireflection layer is recorded as an image using SEM, TEM or laser microscope, etc., lineal lengths for every area are measured when an additional line is optionally drawn, and an average of the lengths of areas of the shorter one, in the obtained values, is calculated (for example, when a separated structure is a continuous matrix with dispersed phase structure, an island structure makes a short area, and in particle dispersion, particles make short areas).

A low refractive index material forming the short area is preferably a material that can secure adhesion property and film strength, and that can improve abrasion resistance. Usually, since an antireflection layer has a thickness of about 100 nm, reinforcing effect for whole of the antireflection layer may not be fully exhibited by a size of the short area of less than 5 nm. When a size of a short area exceeds 1,000 nm on the other hand, a large refractive index difference between a plurality of low refractive index materials makes scattering by interface in each area increase to a level that may not be neglected. As a result, there is a tendency for formed antireflection layer to present white blurring. From this point of view, a size of the short area is 5 to 1,000 nm, preferably 10 to 200 nm, and more preferably 20 to 200 nm.

In the antireflection film, an antireflection layer is preferably made of an area having a material having fluorine as a principal component, and of an area having a polysiloxane structure as a principal component. As a low refractive index material, two or more materials that can form a separated structure may be suitably selected and used, and at least one area is preferably made of a material having fluorine in order to realize antireflection characteristics and also antifouling property. Moreover, in order to improve adhesion property with foundation layers, and a film strength, etc. and to satisfy abrasion resistance, at least one area preferably has a polysiloxane structure. In these cases, it is preferable that an antireflection layer has a continuous matrix with dispersed phase structure and an area having a polysiloxane structure as a principal component has especially an island structure.

In the antireflection film, an antireflection layer may be formed through a hard coat layer. An antireflection layer may be formed directly or through an other layer on a transparent base film, and formation of hard coat layer improves abrasion resistance. An antireflection layer of this invention has especially excellent adhesion property with a hard coat layer, which may improve abrasion resistance.

In the antireflection film, it is preferable that an antireflection layer has uneven shape and has antiglare property. By giving uneven shape to the film, an antireflection antiglare film with light diffusibility may be obtained. For example, a hard coat layer in which the particles are dispersed to form uneven shape surface may form the uneven shape.

An antireflection layer of the antireflection antiglare film preferably has 60° glossiness of a surface thereof of 20 to 120%. Less than 20% of 60° glossiness exhibits strong light scattering on the surface, and gives a whitish screen. On the other hand, a glossiness exceeding 120% causes ghost phenomenon in which outside environment of lighting light, such as fluorescent lamp and sunlight, keyboarders, etc. is reflected on the screen, decreasing visibility. The 60° glossiness is more preferably 40 to 100%.

Moreover, the antireflection antiglare film has preferably a haze value of 10 to 60%. A haze value of less than 10% gives poor antiglare property, and on the other hand, a haze value exceeding 60% reduces light transmittance. A haze value is more preferably 20 to 50%.

Moreover, this invention relates to a polarizing plate in which a transparent base film as the antireflection film (antireflection antiglare film included) is formed on one or both sides of a polarizer as a protective film. Furthermore, this invention relates to an optical element comprising the antireflection film concerned or the polarizing plate. Furthermore, this invention relates to an image viewing display comprising the antireflection film, the polarizing plate, or the optical element. Optical elements, such as antireflection polarizing plates comprising an antireflection film of this invention, can reduce reflected light, and have outstanding abrasion resistance. Moreover, an antireflection antiglare film having antiglare characteristics does not show projective, but has excellent visibility. The optical element may be used for various kinds of applications, and image viewing displays, such as liquid crystal displays equipped with the optical element have excellent display quality.

Furthermore, this invention relates to a method for manufacturing an antireflection film forming an antireflection layer at least on one side of a transparent base film directly or through an other layer, comprising the steps of:

coating a coating liquid including at least two kinds of low refractive index materials satisfying a relationship of refractive index: $n_d^{20} \leq 1.49$ dissolved in a solvent; and drying a coated layer to give the of the antireflection layer.

In the method for manufacturing the antireflection film, it is preferable that the low refractive index materials comprises a material having fluorine and a polysiloxane forming material, and the solvent is a mixed solvent comprising a ketone solvent and an alcohol solvent.

An antireflection film of this invention can suitably be manufactured using a method for manufacturing the antireflection film.

BEST MODE FOR CARRYING-OUT OF THE INVENTION

Figure 1:
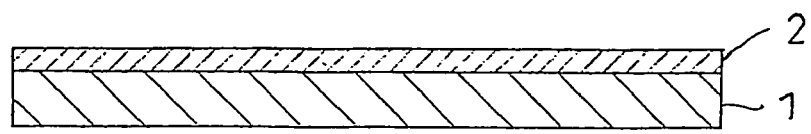
FIG. 1 is an example of an antireflection film of the present invention.
Figure 2:
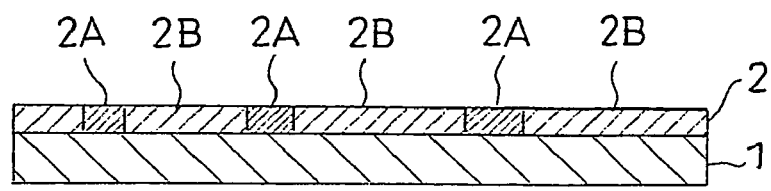
FIG. 2 is an example of an antireflection film of the present invention.

Preferable embodiments of the present invention will, hereinafter, be described, with reference to Figures. FIG. 1 shows an antireflection film wherein an antireflection layer 2 is formed of a low refractive index material on a transparent base film 1. FIG. 2 is an example in which an antireflection layer 2 has a continuous matrix with dispersed phase structure, and, 2A is an island structure and 2B a continuous matrix with dispersed phase structure.

Figure 3:
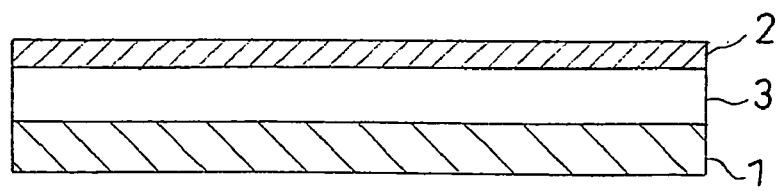
FIG. 3 is an example of an antireflection film of the present invention.
Figure 4:
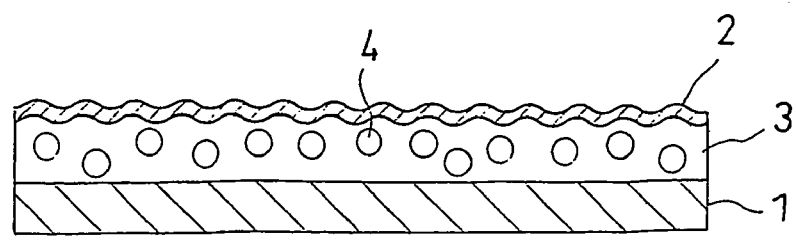
FIG. 4 is an example of an antireflection antiglare film of the present invention.

Moreover, FIG. 3 shows an antireflection film in which a hard coat layer 3 and subsequently an antireflection layer 2 are formed on a transparent base film 1. FIG. 4 shows an antireflection antiglare film in which a hard coat layer (antiglare layer) 3 with uneven shape surface formed of particles 4 thereon is formed, and subsequently an antireflection layer 2 is formed on a transparent base film 1.

As the transparent base film 1, for example, a transparent polymer films made of: polyester type polymers, such as polyethylene terephthalate and polyethylenenaphthalate; cellulose type polymers, such as diacetyl cellulose and triacetyl cellulose; polycarbonate type polymer; acrylics type polymer, such as poly methylmethacrylate, may be mentioned. And a transparent polymer films made of: styrene type polymers, such as polystyrene and acrylonitrile-styrene copolymer, polyolefin type polymers, such as polyethylene, polypropylene, polyolefin that has cyclo-type or norbornene structure, ethylene-propylene copolymer; vinyl chloride type polymer; amide type polymers, such as nylon and aromatic polyamide; may be mentioned. And the transparent polymer films made of: imide type polymers; sulfone type polymers; polyether sulfone type polymers; polyetherether ketone type polymers; poly phenylene sulfide type polymers; vinyl alcohol type polymer; vinylidene chloride type polymers; vinyl butyral type polymers; allylate type polymers; polyoxymethylene type polymers; epoxy type polymers; or blend polymers of the above-mentioned polymers; may be mentioned. The transparent base film can be made of cured layer of heat curing type or ultraviolet ray curing type resins, such as acryl based, urethane based, acryl urethane based, epoxy based, and silicone based.

Moreover, as is described in Japanese Patent Laid-Open Publication No. 2001-343529 (WO 01/37007), polymer films, for example, resin compositions including (A) thermoplastic resins having substituted and/or non-substituted imido group is in side chain, and (B) thermoplastic resins having substituted and/or non-substituted phenyl and nitrile group in sidechain may be mentioned. As an illustrative example, a film may be mentioned that is made of a resin composition including alternating copolymer comprising iso-butylene and N-methyl maleimide, and acrylonitrile-styrene copolymer. A film comprising mixture extruded article of resin compositions etc. may be used.

Moreover, it is preferable that the base film may have as little coloring as possible. Accordingly, a protective film having a retardation value in a film thickness direction represented by $Rth=[(nx+ny)/2-nz] \times d$ of $-90$ nm through $+75$ nm (where, nx and ny represent principal indices of refraction in a film plane, nz represents refractive index in a film thickness direction, and d represents a film thickness) may be preferably used. Thus, coloring (optical coloring) of polarizing plate resulting from a protective film may mostly be cancelled using a protective film having a retardation value (Rth) of $-90$ nm through $+75$ nm in a thickness direction. The retardation value (Rth) in a thickness direction is preferably $-80$ nm through $+60$ nm, and especially preferably $-70$ nm through $+45$ nm.

The transparent base film 1 preferably has an excellent light transmittance (90% or more of transmittance) of visible light, and has outstanding transparency (a haze value of 1% or less). Although a thickness of the transparent base film 1 may suitably be determined, in view of strength, workability in handling, and necessity for being a thin layer, it is about 10 to 500 µm, preferably 20 to 300 µm, and more preferably 30 to 200 µm. A refractive index of the transparent base film 1 is about 1.45 to 1.7, and preferably about 1.48 to 1.65.

The antireflection layer 2 is formed with at least two kinds of low refractive index materials having a refractive index of 1.49 or less. Although a method for forming the antireflection layer 2 is not especially limited, but following methods may be employed.

For example, the method includes: (1) a method of using a forming material obtained by adding ultra fine particles (mean particle diameter: 100 nm or less) prepared beforehand with low refractive index materials, such as $SiO_2$ and $MgF_2$ into an other low refractive index material different from a material of the ultra fine particles; (2) a method of charging a low refractive index material into pores of a film having a very large pores formed using sol-gel reaction of alkoxy silanes etc.; and (3) a method using phase separation by a film formation process of at least two kinds of low refractive index materials.

Among the above-mentioned methods, the method (3) may preferably be adopted from a viewpoint of adhesion property between low refractive index materials, and simplicity of processes. In the method (3), usually a coating liquid obtained by dissolving at least two kinds of low refractive index materials in a solvent is coated, and, subsequently a drying process is performed. Since, in general, polymers do not have mutual compatibility unless molecular weights and skeletons are very similar, after coating of the coating liquid dissolved in a common solvent, volatilization of the solvent is accompanied by phase separation in a drying process. Moreover, also in combination of monomers, phase separation can be generated using difference of cross-linking form, reactivity, affinity with solvents, etc.

It is preferable to combine materials having outstanding antireflection characteristics and materials having outstanding abrasion resistance as low refractive index materials. As materials excellent in antireflection characteristics, in view of controlling of refractive index, fluorine based resins and silicone based resins are preferable. These are excellent also from a viewpoint of antifouling property, such as in wiping of fingerprints. As materials excellent in abrasion resistance, in view of improvement in adhesion, or maintenance of film strength, polysiloxane based resins, poly silazane based resins, and acrylic based resins, etc. are preferable. Forming materials of the low refractive index material may be of polymers after polymerization, and may be of oligomers or monomers used as precursors.

In combination of a material having excellent antireflection characteristics, and a material having excellent abrasion resistance, a ratio of (former):(latter)=1:100 to 100:1(weight ratio), and preferably 1:10 to 10:1.

In combination of the low refractive index materials, a combination enabling formation of an area having a material having fluorine as a principal component, and an area having a polysiloxane structure as a principal component is preferable.

Polymers including fluorine may be mentioned as a material having fluorine. As monomers for forming polymers including fluorine, for example, there may be mentioned: fluoro olefins, such as tetrafluoro ethylene, hexafluoro propylene, 3,3,3-trifluoro propylene; alkyl perfluoro vinyl ethers or alkoxy alkyl perfluoro vinyl ethers; perfluoro(alkyl vinyl ether)s, such as perfluoro(methyl vinyl ether), perfluoro(ethyl vinyl ether), perfluoro(propyl vinyl ether), perfluoro(butyl vinyl ether), perfluoro(isobutyl vinyl ether) etc.; and perfluoro(alkoxy alkyl vinyl ether)s, such as perfluoro(propoxy propyl vinyl ether) etc. One kind or two or more kinds of these monomers may be used in combination, and furthermore these monomers may also be copolymerized with other monomers.

Moreover, as materials including fluorine, sol-gel based materials including fluorine, such as perfluoro alkyl alkoxy silanes may be used. As perfluoro alkyl alkoxy silanes, for example, compounds expressed by a general formula (1): $CF_3(CF_2)_nCH_2CH_2Si(OR)_3$ (where R represents an alkyl group of 1 to 5 carbon atoms, and n represents an integer of 0 to 12) may be mentioned. As practical examples, for example, there may be mentioned: trifluoro propyl trimethoxy silane, trifluoro propyl triethoxy silane, tridecafluoro octyl trimethoxy silane, tridecafluoro octyl triethoxy silane, heptadeca fluoro decyl trimethoxy silane, heptadeca fluoro decyl triethoxy silane, etc. Among them, compounds having the above-mentioned n of 2 to 6 are preferable.

As forming materials for a polysiloxane structure, sol-gel based materials using metal alkoxides, such as alkoxy silanes and alkoxy titaniums, etc. may be mentioned. Among them alkoxy silanes are preferable. Examples of alkoxy silane include: tetra-alkoxy silanes, such as tetramethoxy silane, tetraethoxy silane, tetrapropoxy silane, tetraisopropoxy silane, tetrabutoxy silane, etc.; trialkoxy silanes, such as methyl trimethoxy silane, methyltriethoxy silane, methyl tri propoxy silane, methyl tributoxy silane, ethyl trimethoxy silane, ethyltriethoxy silane, n-propyl trimethoxy silane, n-propyl triethoxy silane, isopropyl trimethoxy silane, isopropyl triethoxy silane, vinyl trimethoxy silane, vinyl triethoxy silane, 3-glycidoxy propyl trimethoxy silane, 3-glycidoxy propyl triethoxy silane, 3-mercapto propyl trimethoxy silane, 3-mercapto propyl triethoxy silane, phenyl trimethoxy silane, phenyl triethoxy silane, 3,4-epoxy cyclohexyl ethyl trimethoxy silane, 3,4-epoxy cyclohexyl ethyl trimethoxy silane, etc.; and dimethyl dimethoxy silane, dimethyldiethoxy silane, diethyl dimethoxy silane, diethyl diethoxy silane, etc. These alkoxy silanes may be used as partial condensates etc. Among them, tetra-alkoxy silanes or these partial condensates are preferable. Especially, tetramethoxy silanes, tetraethoxy silanes, or partial condensates thereof are preferable.

In the method (3), an antireflection layer forming material is preferably prepared as a coating liquid dissolved in a solvent. As solvents, various solvents, such as aromatic based solvents, ester based solvents, alcohols based solvents, ketone based solvents, amide based solvents, sulfoxide based solvents, ether based solvents, and cellosolve based solvents may be mentioned, and they may be used independently of two or more kinds may be used in combination. A solid content concentration is adjusted to about 0.2 to 20% by weight, and preferably 0.5 to 10% by weight.

When a material having fluorine (especially fluorine based polymer) and a polysiloxane forming material are used as low refractive index materials, a mixed solvent including ketone based solvents and alcohol based solvents is preferably used. As ketone based solvents, acetone, methyl ethyl ketone, diethyl ketone, methyl isobutyl ketone, cyclohexanone, cyclopentanone, etc. may be mentioned. Moreover, as alcohol based solvents, methanol, ethanol, n-propyl alcohol, i-propyl alcohol, n-butanol, i-butanol, t-butanol, etc. may be mentioned. Especially, a combination of methyl ethyl ketone or methyl isobutyl ketone as ketone based solvent, and ethanol, n-butanol or t-butanol as alcohol based solvent is preferable. Although a ratio of the ketone based solvents and the alcohol based solvents is not especially limited, a ratio of (ketone based solvent):(alcohol based solvent) is preferably 1:20 to 20:1 (weight ratio), and more preferably 1:5 to 5:1.

Furthermore, in addition to the low-refraction component, compatibilizers, cross linking agents, coupling agents, antioxidants, ultraviolet absorbers, refractive index regulators, etc. may suitably be added in a coating liquid for forming an antireflection layer if needed.

Methods of forming antireflection layer 2 are not especially limited, but an antireflection layer 2 is prepared on a hard coat layer 3 using suitable methods. For example, proper methods, such as a doctor blade method, a photogravure roll coater method, and a dipping method may be mentioned. A size of the separated structure (continuous matrix with dispersed phase structure) may be controlled by conditions in antireflection layer formation. For example, controlling of solvents, a rate of drying of the solvent, etc. when a method in which phase separation is carried out by the method (3) is used, may control it.

A thickness of antireflection layer 2 is not especially limited, but preferably it is usually about 70 to 120 nm in terms of a mean value. As conditions of controlling reflectance for a light with a wavelength of 550 nm having a highest visual sensitivity, it is most effective to set a relationship of (thickness: nm)=550 nm/(4×(average refractive index of antireflection layer)) as a target.

An antireflection layer 2 may be formed on a transparent base film 1, and other layer may be prepared therebetween. As another layer, a hard coat layer 3 may be mentioned. A refractive index of the antireflection layer 2 is preferably adjusted lower than a refractive index of the hard coat layer 3, and moreover, it is preferably adjusted lower than a refractive index of the transparent base film 1.

As organic resin materials for forming the hard coat layer 3, materials giving sufficient strength for a film after layer formation and having transparency may be used especially without any limitation. As the organic resin materials, heat curing type resins, thermoplastic type resins, ultraviolet curing type resins, electron beam curable resins, two-liquid mixing type resins, etc. may be mentioned. Among them, ultraviolet curing type resins are suitable, allowing curing treatment with UV irradiation to efficiently form a hard coat layer using easy processing operation. As ultraviolet curing type resins, various kinds of resins, such as polyester based, acrylic based, urethane based, acrylic urethane based, amide based, silicone based, and epoxy based, etc. may be mentioned, and also among them, ultraviolet curing type monomers, oligomers, polymers, etc. are included. As ultraviolet curing type resins to be suitably used, for example, resins having ultraviolet radiation polymerizable functional group(s), especially resins including acrylic based monomer(s) and oligomer(s) having 2 or more, especially 3 to 6, of functional groups may be mentioned. Moreover, ultraviolet radiation polymerization initiator(s) are blended in the ultraviolet curing type resins.

The hard coat layer 3 may include inorganic or organic fillers having a spherical form or an amorphous form. For example, it may include ultra fine particles having a mean particle diameter of 0.1 μm or less. As the type of ultra fine particles, for example, inorganic based particles, such as glass, silica, alumina, calcium oxide, titania, zirconium oxide, and zinc oxide; and electrically conductive inorganic based particles, such as tin oxides, indium oxides, cadmium oxides, antimony oxides, or composites thereof may be mentioned. Among the ultra fine particles, use of conductive inorganic based particles can effectively improve dustproof property. As ultra fine particles, ITO (indium oxide/tin oxide), ATO (antimony oxide/tin oxide), tin oxides, etc. may preferably be used.

A refractive index of the hard coat layer 3 is preferably adjusted so that it may be higher than a refractive index of the transparent base film 1, and in general, the refractive index is preferably adjusted so as to be about 1.49 to 1.8.

Moreover, uneven shape may be given for an antireflection layer 2 in order to provide antiglare property to the antireflection film of this invention. Methods of giving uneven shape to the antireflection layer 2 are not especially limited, and, for example, the antireflection layer 2 itself may be formed to have uneven shape. Besides, uneven structure may be given to a surface of the hard coat layer 3 to give antiglare property to the hard coat layer.

Methods for giving antiglare property to the hard coat layer 3 are not especially limited. For example, there may be mentioned: a method in which a surface of a transparent base film is processed using proper methods, such as sandblasting, embossing roll, and chemical etching to give rough surface thereto, and then a hard coat layer is formed on the rough-surfaced plane to give fine uneven structure; a method in which fine uneven structure is given to a hard coat layer surface using a transferring method with metal mold etc.; and a method in which fine uneven structure is formed with a hard coat layer including particles 4 dispersed therein as shown in FIG. 4.

As particles 4 for forming the fine uneven structure, cross-linked or non-cross-linked organic based particles comprising various polymers, such as resins of PMMAs (polymethyl methacrylates), polyurethanes, polystyrenes, and melamines; inorganic based particles, such as glass, silica, alumina, calcium oxide, titania, zirconium oxide, and zinc oxide; conductive inorganic based particles, such as tin oxides, indium oxides, cadmium oxides, antimony oxides, or composites thereof may be used. In order to realize antiglare property, a mean particle diameter of the particles 4 is 30 µm or less, preferably 0.1 to 15 µm, more preferably 0.5 to 10 µm, still more preferably 0.5 to 5 µg/m, and furthermore preferably 1 to 4 µm. When forming fine uneven structure using particles, an amount of the particles used is preferably about 1 to 30 parts by weight to a resin 100 parts by weight.

Besides, in formation of the hard coat layer (antiglare layer) 3, additives, such as leveling agents, thixotropic agents, and antistatic agents, may be added. In formation of the hard coat layer (antiglare layer) 3, inclusion of thixotropic agents (0.1 µm or less of silica, mica, etc.) can easily form a fine uneven structure with projected particles formed in a surface of the antiglare layer.

Methods for forming a hard coat layer 3 is not especially limited, but proper methods may be adopted. For example, the resin is coated on the transparent base film 1 and curing treatment is performed after dried. In a case the resin includes particles 4, a hard coat layer (antiglare layer) 3 presenting uneven shape to the surface is formed. The resin is coated using proper methods, such as fountain coating, die coating, casting, spin coating, fountain metalling, and photogravure. Besides, the resin may be diluted with commonly used solvents, such as toluene, ethyl acetate, butyl acetate, methyl ethyl ketone, methyl isobutylketone, isopropyl alcohol, and ethyl alcohol, in coating process, or may be coated as it is, without diluted. And, although a thickness of the hard coat layer 3 is not especially limited, it is preferably 20 µm or less, about 0.5 to 20 µm, and more preferably 1 to 10 µm.

In the antireflection film, it is preferable that a refractive index of the hard coat layer 3 is higher than a refractive index of the transparent base film 1 and a refractive index of the antireflection layer 2 is lower than a refractive index of the transparent base film 1. From a viewpoint of reflectance, the hard coat layer 3 is required for a high refractive index, and the antireflection layer 2 is required for a lower refractive index. In order to obtain an antireflection film having excellent antireflection effect and high display quality, the refractive index of the transparent base film 1 is preferably between the refractive index of the hard coat layer 3 and the refractive index of the antireflection layer 2 so that refractive indexes satisfy a relationship: (hard coat layer 3)>(transparent base film 1)>(antireflection layer 2).

The antireflection film may have a medium refractive index layer having a refractive index higher than a refractive index of the transparent base film 1, and a refractive index lower than a refractive index of the hard coat layer 3 between the transparent base film 1 and the hard coat layers 3. Formation of this medium refractive index layer enables effective prevention of interference fringe of reflected light even when a hard coat layer 3 having a high refractive index is used.

As long as a material of the medium refractive index layer is a material having a middle refractive index between a refractive index of the hard coat layer 3 and a refractive index of the transparent base film 1, the material is not especially be limited and a method for forming it will not be limited, either. As materials for forming the medium refractive index layer, similar materials as forming materials for the hard coat layer 3, and furthermore inorganic based materials, such as alkoxy silane solutions may be used. Among them, heat curing type resin based materials and ultraviolet curing type resin based materials are preferable. Curing treatment using heating or ultraviolet radiation may form the medium refractive index layer. For example, conductive ultra fine particles having a mean particle diameter of 0.1 µm or less, such as ITO (indium oxide/tin oxide), ATO (antimony oxide/tin oxide), and tin oxides may be dispersed to be included in the medium refractive index layer. A thickness of the medium refractive index layer is not especially limited, it is about 1 µm or less, and preferably 50 to 500 nm.

Optical element(s) may be adhered to the transparent base film 1 of the antireflection film. As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine is absorbed and aligned after stretched is suitably used. Although thickness of polarizer is not especially limited, the thickness of about 5 to 80 µm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent base film in the above described illustration may be used. As the above described transparent protective film, a transparent protective film whose both sides, surface side and backside, are formed from same polymer material may be used, and also a transparent protective film whose both sides are formed by different polymer materials etc. may be used. As transparent protective films here, transparent protective films having excellent transparency, mechanical strength, thermal stability, and moisture barrier property may preferably be used. And transparent protective films having smaller optical anisotropy, such as retardation, are more preferable in many cases. As polymer for forming the transparent protective film, triacetyl cellulose is most suitable. When the antireflection films are prepared on one side or both sides of a polarizer (polarizing plate), a transparent base film of the antireflection film may also serve as a transparent protective film of the polarizer. A thickness of the transparent protective film is not especially limited, and it is about 10 to 300 μm in general.

In an antireflection polarizing plate having a polarizing plate laminated on an antireflection film, a transparent protective film, a polarizer, and a transparent protective film may be laminated in this sequential order on the antireflection film, a polarizer and a transparent protective film may be laminated in this sequential order on an antireflection film.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curable type resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

Moreover, for example, a hard coat layer, a primer layer, an adhesive layer, a pressure sensitive adhesive layer, an antistatic layer, an electrically conductive layer, a gas barrier layer, a steam barrier layer, a moisture barrier layer, etc. may be inserted in between layers of polarizing plates, or these may be laminated on a surface of the polarizing plate. Besides, in a stage for forming each layer of the polarizing plate, for example, if required, various characteristics may be improved by adding or mixing conductive particles, antistatic agents, various particles, plasticizers, etc. into forming materials of each layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate. Antireflection film is provided onto a polarizing plate side in an elliptically polarizing plate and a polarizing plate with optical compensation, etc.

Furthermore, there may be given, if needed, treatments for giving various characteristics and functions, such as abrasion resistance, durability, weather resistance, wet heat resistance, heat resistance, moisture resistance, moisture permeability, antistatic properties, conductivity, improvement in adhesion property between layers, improvement in mechanical strength etc. or functional layers may be inserted therein, or laminated thereon.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called $\lambda/4$ plate) is used. Usually, half-wavelength plate (also called $\lambda/2$ plate) is used, when changing the polarization direction of linearly polarized light.

Elliptically polarizing plate is effectively used to give a monochrome display without above-mentioned coloring by compensating (preventing) coloring (blue or yellow color)

produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such a viewing angle compensation retardation plate, in addition, a film having birefringence property that is processed by uniaxial stretching or orthogonal biaxial stretching and a biaxial stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multilayered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although a laminating of the above described antireflection film to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the antireflection film, while a layer not prepared the antireflection film an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains particle and shows optical diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the antireflection film of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, optical diffusion plate, and backlight, may be installed in suitable position in one layer or two or more layers.

Subsequently, organic electro luminescence equipment (organic EL display) will be explained. Generally, in organic EL display, a transparent electrode, an organic emitting layer and a metal electrode are laminated on a transparent base film in an order configuring an illuminant (organic electro luminescence illuminant). Here, a organic emitting layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic emitting layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic emitting layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic emitting layer is formed by a very thin film about 10 nm in thickness. For this reason, light is transmitted nearly completely through organic emitting layer as through transparent electrode. Consequently, since the light that enters, when light is not emitted, as incident light from a surface of a transparent base film and is transmitted through a transparent electrode and an organic emitting layer and then is reflected by a metal electrode, appears in front surface side of the transparent base film again, a display side of the organic EL display looks like mirror if viewed from outside.

In an organic EL display containing an organic electro luminescence illuminant equipped with a transparent electrode on a surface side of an organic emitting layer that emits light by impression of voltage, and at the same time equipped with a metal electrode on a back side of organic emitting layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent base film, the transparent electrode and the organic thin film, and is reflected by the metal electrode, and then is transmitted through the organic thin film, the transparent electrode and the transparent base film again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Hereinafter, concrete description of the present invention will be given with reference to Examples, but this invention is not limited at all by these Examples.

In each Example, unless it is indicated in particular, part and % represents "by weight".

Example 1

(Preparation of Antireflection Layer Forming Material)

A polyfluoroolefin resin (tetrafluoroethylene/hexafluoropropylene/propylene copolymer) having a number average molecular weight of 5000 (expressed in terms of polystyrene) 100 parts, and 30 parts of a siloxane oligomer (partially condensation polymerized polymer of tetraethoxy silane) having a number average molecular weight of 700 were dissolved in a mixed solvent of methyl ethyl ketone: methyl isobutyl ketone: isopropyl alcohol=10:70:20 (weight ratio) to obtain a coating liquid of 2% of solid content concentration. Besides, values of refractive index of films, formed from simple substance of each material, measured using Abbe refractive index meter gave the polyfluoroolefin resin: 1.38; and a polysiloxane obtained from the siloxane oligomer: 1.45, respectively.

(Production of Antireflection Film)

Next, this coating liquid was coated on a polyethylene terephthalate film using a wire bar so that a thickness after cured may be 100 nm, subsequently the solvent was removed by drying, and obtained film was heated at 100° C. for 1 hour, and an antireflection layer was formed to obtain an antireflection film. Observation using a TEM of the antireflection layer of the antireflection film showed that a continuous matrix with dispersed phase structure was formed and a polysiloxane structure had an island structure with average size of about 10 nm.

Example 2

(Production of Antireflection Film)

A same method as in Example 1 was repeated and antireflection film was obtained, except that: in (production of antireflection film) in Example 1, an antireflection layer was formed on a hard coat layer using a film having the hard coat layer with 5 µm thickness obtained by applying, on a triacetyl cellulose film instead of the polyethylene terephthalate film, a toluene solution of a ultraviolet curing type acrylic based hard coat resin using a wire bar, and by irradiating ultraviolet rays with a low pressure UV lamp after removing of a solvent by drying. Observation of the antireflection layer of the antireflection film using a TEM showed that a continuous matrix with dispersed phase structure was formed and a polysiloxane structure had an island structure with average size of about 10 nm.

Example 3

(Preparation of Antireflection Layer Forming Material)

A coating liquid was prepared that was obtained by adding a silica sol (ethanol solvent, 20%, mean particle diameter of 90 nm) in a solution (ethanol solvent, 2% solution) of a material having fluorine including perfluoro alkyl silane so that a solid content concentration after drying might be 15%. Besides, values of refractive index of films, formed from simple substance of each material, measured using Abbe refractive index meter gave the perfluoro alkyl silane: 1.40; and the silica sol: 1.45, respectively.

Production of Antireflection Film

A same method as in (production of antireflection film) in Example 2 was repeated by using the antireflection layer forming material to produce an antireflection film. Observation of the antireflection layer of the antireflection film using a SEM showed that a separated structure in a state where the silica sol was dispersed was formed.

Example 4

(Production of Antireflection Film)

A same method as in Example 1 was repeated to obtain an antireflection (antiglare) film except that: in (production of antireflection film) in Example 1, an antireflection layer was formed on a hard coat layer (antiglare layer) using a film having the hard coat layer with 5 µm thickness obtained by applying, on a triacetyl cellulose film instead of the polyethylene terephthalate film, a toluene solution of a ultraviolet curing type acrylic based hard coat resin including 8 parts of spherical silica beads with a mean particle diameter of 2 µm to 100 parts of solid content of the resin using a wire bar, and by irradiating ultraviolet rays with a low pressure UV lamp after removing of a solvent by drying. Observation of the antireflection layer of the antireflection (antiglare) film using a TEM showed that a continuous matrix with dispersed phase structure was formed and a polysiloxane structure had an island structure with average size of about 10 nm.

Comparative Example 1

Except for not having blended the siloxane oligomer in (preparation of antireflection layer forming material) in Example 1, a similar method as in (preparation of antireflection layer forming material) in Example 1 was repeated to obtain a coating liquid. Besides, using the antireflection layer forming material (coating liquid), a similar method as in (production of antireflection film) in Example 2 was repeated to produce an antireflection film. Observation of the antireflection layer of the antireflection film using a TEM showed that a separated structure was not formed.

Comparative Example 2

Except for not having blended the polyfluoroolefin resin in (preparation of antireflection layer forming material) in Example 1, a similar method as in (preparation of antireflection layer forming material) in Example 1 was repeated to obtain a coating liquid. Besides, using the antireflection layer forming material (coating liquid), a similar method as in (production of antireflection film) in Example 2 was repeated to produce an antireflection film. Observation of the antireflection layer of the antireflection film using a TEM showed that a separated structure was not formed.

Referential Example 1

Except for having used methylisobutylketone independently as a solvent in (preparation of antireflection layer forming material) in Example 1, a similar method as in (preparation of antireflection layer forming material) in Example 1 was repeated to obtain a coating liquid. Besides, using the antireflection layer forming material (coating liquid), a similar method as in (production of antireflection film) in Example 2 was repeated to produce an antireflection film. Observation of the antireflection layer of the antireflection film using a TEM showed that a separated structure was not formed.

(Evaluation)

Antireflection films obtained by Examples 1 to 4, Comparative Examples 1 to 2, and Referential Example 1 were measured for following evaluation results. Table 1 shows the results.

(Reflectance)

The base film side of then antireflection film was roughened using steel wool, and then a black acryl lacquer was sprayed so that reflected light by a back side might not be given to an antireflection layer. In this state, spectral reflectance was measured using a spectrophotometer with inclined integrating sphere (UV-2400 made by Shimadzu Corporation). A Y value in visual field of 2° of illuminant C was calculated from the result.

(Abrasion Resistance)

After 10 alternating motions were given to the antireflection film (antireflection layer) by a load of 400 g/25 mmφ using a steel wool #0000, a surface of the antireflection layer was visually observed, and damaged state was evaluated on following criteria.
○: scratch hardly recognized
Δ: scratch slightly recognized
x: most antireflection layers scraped off (Fingerprint Wiping Property)

Wiping off property of sebum forcibly attached onto the antireflection film (antireflection layer) using facial tissue was estimated by visual inspection on the following criteria.
○: Wiped off easily.
x: not wiped off completely.

TABLE 1

|  | Reflectance (%) | Abrasion resistance | Fingerprint wiping property |
| --- | --- | --- | --- |
| Example 1 | 1.3 | ○ | ○ |
| Example 2 | 2.1 | ○ | ○ |
| Example 3 | 2.2 | Δ | ○ |
| Example 4 | 2.3 | ○ | ○ |
| Comparative Example 1 | 1.8 | x | ○ |
| Comparative Example 2 | 3.0 | ○ | x |
| Referential Example 1 | 2.2 | x | ○ |

Table 1 shows that antireflection films of Examples have an antireflection layer having reflectance and abrasion resistance simultaneously, and moreover having excellent practical use, enabling fingerprint wiping property. Besides, it shows that a fine structure (separated structure) currently formed in the antireflection layer is effective in antireflection effect, and in coexistence of abrasion resistance and fingerprint wiping property.

Example 5

(Preparation of Antireflection Layer Forming Material)

A polyfluoroolefin resin (tetrafluoroethylene/hexafluoropropylene/propylene copolymer) having a number average molecular weight of 5000 (expressed in terms of polystyrene) 30 parts, and 70 parts of a siloxane oligomer (partially condensation polymerized polymer of tetraethoxy silane) having a number average molecular weight of 700 were dissolved in a mixed solvent of methyl ethyl ketone: methyl isobutyl ketone: isopropyl alcohol 10:70:20 (weight ratio) to obtain a coating liquid of 2% of solid content concentration. Besides, values of refractive index of films, formed from simple substance of each material, measured using Abbe refractive index meter gave the polyfluoroolefin resin: 1.38; and a polysiloxane obtained from the siloxane oligomer: 1.45, respectively.

(Production of Antireflection Film)

A toluene solution in which 8 parts of spherical polystyrene beads with a mean particle diameter of 3.5 μm were added to 100 parts of solid content of a ultraviolet curing type acrylic based hard coat resin was coated on a triacetyl cellulose film with a thickness of 80 μm using a wire bar. Ultraviolet radiation was irradiated using a low pressure UV lamp after removing of the solvent by drying to form a hard coat layer (antiglare layer) having a thickness of 5 μm.

The coating liquid was coated on the hard coat layer (antiglare layer) using a wire bar so that a thickness after curing might be 100 nm. The obtained layer was heated at 100° C. for 1 hour after removing of a solvent by drying, and thus an antireflection layer was formed to obtain an antireflection (antiglare) film.

Example 6

Except for having used a toluene solution in which 14 parts of an amorphous silica having a mean particle diameter of 4.0 μm was added to 100 parts of solid content of the ultraviolet curing type acrylic based hard coat resin in (production of antireflection film) in Example 5, a similar method as in Example 5 was repeated to form a hard coat layer (antiglare layer). Besides, a similar method as in Example 5 was repeated, and an antireflection layer was formed to obtain an antireflection (antiglare) film.

Example 7

Except for having used a toluene solution in which 6.5 parts of an amorphous silica having a mean particle diameter of 4.0 μm and 6.5 parts of an amorphous silica having a mean particle diameter of 2.7 μm were added to 100 part of solid content of the ultraviolet curing type acrylic based hard coat resin in (production of antireflection film) in Example 5, a similar method as Example 5 was repeated to obtain a hard coat layer (antiglare layer). Besides, a similar method as in Example 5 was repeated, and an antireflection layer was formed to obtain an antireflection (antiglare) film.

Comparative Example 3

Except for not having blended the siloxane oligomer, a similar method as in (preparation of antireflection layer forming material) in Example 5 was repeated to obtain a coating liquid. Besides, a hard coat layer (antiglare layer) was formed using the antireflection layer forming material (coating liquid). Then a similar method as in Example 5 was repeated, and an antireflection layer was formed to obtain an antireflection (antiglare) film.

Referential Example 2

Except for having used methyl isobutyl ketone independently as a solvent in (preparation of antireflection layer forming material) in Example 5, a similar method as in (preparation of antireflection layer forming material) in Example 5 was repeated to obtain a coating liquid. Besides, a hard coat layer (antiglare layer) was formed using the antireflection layer forming material (coating liquid). Then a similar method as in Example 5 was repeated, and an antireflection layer was formed to obtain an antireflection (antiglare) film.

(Evaluation)

Antireflection films obtained in Examples 5 to 7, Comparative Example 3, and Referential Example 2 were evaluated for reflectance, abrasion resistance, and fingerprint wiping property as mentioned above. And, haze value was measured to evaluate antiglare property. Table 2 shows the results.

(Haze)

Antireflection film was measured using a haze meter (made by Murakami Color Research Laboratory, HM-150) according to JIS K 7105.

Antiglare Property
○: Haze value 10 to 60%.
x: Others.

TABLE 2

| | Reflectance (%) | Abrasion resistance | Fingerprint wiping property | Haze (%) | Antiglare property |
|---|---|---|---|---|---|
| Example 5 | 2.1 | ○ | ○ | 43 | ○ |
| Example 6 | 2.3 | ○ | ○ | 23 | ○ |
| Example 7 | 2.6 | ○ | ○ | 12 | ○ |
| Comparative Example 3 | 1.8 | x | ○ | 43 | ○ |
| Referential Example 2 | 2.2 | x | ○ | 43 | ○ |

Table 2 shows that antireflection films of Examples have an antireflection layer having reflectance and abrasion resistance simultaneously, and moreover having excellent practical use, enabling fingerprint wiping property. And, it shows that an antireflection antiglare film having an antiglare layer prepared as a hard coat layer has excellent antiglare property.

Example 8

(Preparation of Antireflection Layer Forming Material)

A polyfluoroolefin resin (tetrafluoroethylene/hexafluoropropylene/propylene copolymer) having a number average molecular weight of 5000 (expressed in terms of polystyrene) 100 parts, and 230 parts of a siloxane oligomer (partially condensation polymerized polymer of tetraethoxy silane) having a number average molecular weight of 700 were dissolved in a mixed solvent of methyl ethyl ketone: methyl isobutylketone: isopropyl alcohol=10:70:20 (weight ratio) to obtain a coating liquid of 2% of solid content concentration. Besides, values of refractive index of films, formed from simple substance of each material, measured using Abbe refractive index meter gave the polyfluoroolefin resin: 1.38; and a polysiloxane obtained from the siloxane oligomer: 1.45, respectively.

(Production of Antireflection Film)

A toluene solution in which 8 parts of a spherical silica beads having a mean particle diameter of 2 μm were added to 100 parts of solid content of a ultraviolet curing type acrylic based hard coat resin was coated on a triacetyl cellulose film with a thickness of 80 μm using a wire bar. Ultraviolet radiation was irradiated using a low pressure UV lamp after removing of the solvent by drying to form a hard coat layer (antiglare layer) having a thickness of 5 μm.

The coating liquid was coated on the hard coat layer (antiglare layer) using a wire bar so that a thickness after curing might be 100 nm. The obtained layer was heated at 100° C. for 1 hour after removing of a solvent by drying, and thus an antireflection layer was formed to obtain an antireflection (antiglare) film.

Example 9

Except for having used a toluene solution in which 15 parts of polystyrene beads having a mean particle diameter of 3 μm were added to 100 parts of the solid content of the ultraviolet curing type acrylic based hard coat resin in (production of antireflection film) in Example 8, a similar method as in Example 8 was repeated to form a hard coat layer (antiglare layer). And a similar method as in Example 8 was repeated, and an antireflection layer was formed to obtain an antireflection (antiglare) film.

Example 10

Except for having used the toluene solution, without blending particles to the ultraviolet curing type acrylic based hard coat resin in (production of antireflection film) in Example 8, a similar method as in Example 8 was repeated to obtain a hard coat layer (antiglare layer). And a similar method as in Example 8 was repeated, and an antireflection layer was formed to obtain an antireflection (antiglare) film.

Comparative Example 4

Except for not having blended the siloxane oligomer in (preparation of antireflection layer forming material) in Example 8, a similar method as in (preparation of antireflection layer forming material) in Example 8 was repeated to obtain a coating liquid. And, a hard coat layer (antiglare) was formed using the antireflection layer forming material (coating liquid). Moreover a similar method as in Example 8 was repeated, and an antireflection layer was formed to obtain an antireflection (antiglare) film.

Comparative Example 5

Except for not having blended the polyfluoroolefin resin in (preparation of antireflection layer forming material) in Example 8, a similar method as in (preparation of antireflection layer forming material) in Example 8 was repeated to obtain a coating liquid. And a hard coat layer (antiglare) was formed using the antireflection layer forming material (coating liquid). Moreover, a similar method as in Example 8 was repeated, and an antireflection layer was formed to obtain an antireflection (antiglare) film.

(Evaluation)

Antireflection films obtained in Examples 8 to 10, and Comparative Examples 4 to 5 were evaluated for reflectance, abrasion resistance, and fingerprint wiping property as mentioned above. Moreover, glossiness was measured to evaluate antiglare property. Table 3 shows the results.

(Glossiness)

A 60° glossiness of a surface of antireflection films (antireflection layer) was measured using a glossimeter (made by Suga Test Instruments Co., Ltd., digital bending vibration glossimeter UGV-5DP) based on JIS Z 8741.

(Antiglare Property)
x: 120% or more of the glossiness.
○: 20 to 120% of the glossiness.

TABLE 3

| | Reflectance (%) | Abrasion resistance | Fingerprint wiping property | Glossiness (%) | Antiglare property |
|---|---|---|---|---|---|
| Example 8 | 2.3 | ○ | ○ | 28 | ○ |
| Examle 9 | 2.3 | ○ | ○ | 52 | ○ |
| Example 10 | 2.1 | ○ | ○ | 176 | x |
| Comparative Example 4 | 1.8 | x | ○ | 54 | ○ |
| Referential Example 5 | 3.0 | ○ | x | 50 | ○ |

Table 3 shows that antireflection films of Examples have an antireflection layer having reflectance and abrasion resistance simultaneously, and moreover having excellent practical use, enabling fingerprint wiping property. And, it shows that an antireflection antiglare film having an antiglare layer prepared as a hard coat layer has excellent antiglare property.

In the case where each of the antireflection films of Examples was used as a protection layer of iodine based absorption dichroic polarizer to form a polarizing film, a polarizing film maintaining the above-mentioned characteristics, and having antireflection function with high practical use was obtained.

INDUSTRIAL APPLICABILITY

Optical elements, such as an antireflection film of the present invention, and a polarizing plate having the antireflection film formed thereto, are excellent in antireflection characteristics, abrasion resistance, and furthermore antiglare property. These may suitably be applied for image viewing displays, such as liquid crystal displays (LCD), flat panel displays (FPD), organic EL displays, and PDPs.

The invention claimed is:

1. An antireflection film comprising an antireflection layer being formed at least on one side of a transparent base film directly or through an other layer,
    wherein the antireflection layer is made of at least two kinds of low refractive index materials satisfying a relationship of refractive index: $n_d^{20} \leq 1.49$, and
    the antireflection layer has a separated structure in which areas having mutually different compositions are formed,
    and wherein the antireflection layer is formed of an area made of a material having fluorine as a principal component and an area made of a polysiloxane structure as a principal component.

2. The antireflection film according to claim 1, wherein the separated structure has a continuous matrix with dispersed phase structure.

3. The antireflection film according to claim 1, wherein a size of a short area in the separated structure is in a range of 5 to 1,000 nm.

4. The antireflection film according to claim 1, wherein the antireflection layer is formed through a hard coat layer.

5. The antireflection film according to claim 1, wherein the antireflection layer has an uneven shape and antiglare property.

6. The antireflection film according to claim 5, wherein the antireflection layer is formed through a hard coat layer in which particles are dispersed and the uneven shape surface is formed with the particles.

7. The antireflection film according to claim 5, wherein a 60° glossiness of a surface of the antireflection layer is 20 to 120%.

8. The antireflection film according to claim 5, wherein a Haze value is 10 to 60%.

9. A polarizing plate comprising a polarizer and a protective film being formed on one side or both sides of the polarizer,
    wherein a transparent base film of the antireflection film according to claim 1 is formed on one side or both sides of a polarizer as the protective film.

10. An optical element comprising the antireflection film according to claim 1.

11. An image viewing display comprising the antireflection film according to claim 1.

12. A method for manufacturing an antireflection film comprising an antireflection layer being formed at least on one side of a transparent base film directly or through an other layer, comprising the steps of:
    coating a coating liquid including at least two kinds of low refractive index materials satisfying a relationship of refractive index: $n_d^{20} \leq 1.49$ dissolved in a solvent; and
    drying a coated layer to give the antireflection layer, wherein the antireflection layer has a separated structure in which areas having mutually different compositions are formed,
    wherein the low refractive index material comprises a material having fluorine and a polysiloxane forming material, and the solvent is a mixed solvent comprising a ketone solvent and an alcohol solvent.

13. The antireflection film according to claim 2, wherein a size of a short area in the separated structure is in a range of 5 to 1,000 nm.

14. The antireflection film according to claim 2, wherein the antireflection layer is formed of an area made of a material having fluorine as a principal component and an area made of a polysiloxane structure as a principal component.

15. The antireflection film according to claim 2, wherein the antireflection layer is formed through a hard coat layer.

16. An optical element comprising the polarizing plate according to claim 9.

17. An image viewing display comprising the polarizing plate according to claim 9.

* * * * *